United States Patent Office 3,048,601
Patented Aug. 7, 1962

3,048,601
TRANSESTERIFICATION OF
2,3-EPOXYALKANOATES
Frederick C. Frostick, Jr., and Benjamin Phillips, Charleston, W. Va., assignors to Union Carbide Corporation, a corporation of New York
No Drawing. Filed Apr. 21, 1961, Ser. No. 104,520
3 Claims. (Cl. 260—348)

This invention relates to the transesterification of alkyl 2,3-epoxyalkanoates with allyl alcohol.

This application is a continuation-in-part of application Serial No. 798,851, entitled "Transesterification of 2,3-Epoxyalkanoates," by F. C. Frostick, Jr., and B. Phillips, filed March 12, 1959, and now abandoned, which in turn is a continuation-in-part of application Serial No. 696,039, entitled "Production of 2,3-Epoxyalkanoates," by F. C. Frostick, Jr., and B. Phillips, filed November 13, 1957, now abandoned, both of the above-said applications being assigned to the same assignee as the instant application.

A general characteristic of oxirane compounds, that is, compounds containing

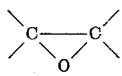

group, is their great reactivity in numerous chemical reactions. The epoxide group is known to react with alcohols, carboxylic acids, carboxylic acid anhydrides, amines, aldehydes, mercaptans, phenols, and a host of other organic reagents as well as with water, mineral acids, hydroxides, alkoxides, phenolates, and the like. Epoxide groups are also known to undergo self-polymerization, i.e., homopolymerization, dimerization, rearrangement, etc., especially when catalyzed by acids, bases, or heat. Because of the relative high reactivity of epoxide groups, molecules containing these groups are oftentimes synthesized in such a manner that the final reaction is the formation of the epoxide group and, generally, reaction conditions are maintained as mild as possible to prevent or minimize the reaction of the epoxide group once it is formed. For instance, if an epoxy ether is desired, the conventional practice is to first prepare the appropriate unsaturated ether and subsequently react said unsaturated ether with a peracid under mild operative conditions to form the epoxy ether product.

The present invention contemplates a one-step transesterification process which comprises reacting alkyl 2,3-epoxyalkanoate described hereinafter with allyl alcohol in the presence of a catalytic quantity of a metal alcoholate described hereinafter thus producing the corresponding 2,3-epoxyalkanoate of allyl alcohol. In view of the relative reactivity of the epoxy group and the numerous competing reactions which strive to take place, such as, self-polymerization, dimerization, rearrangement, reduction, etc., of the epoxide reagent, it is surprising, indeed, that transesterification of the epoxide reagent is accomplished without any appreciable attacking of the epoxide group. A consideration of the prior art will serve to bear out the unobvious and unexpected results achieved by the instant invention. U.S. Patent No. 2,680,109, issued to Stevens et al., discloses one method heretofore employed in preparing allyl 2,3-epoxybutyrate. The patentees first teach the formation of 2-chloro-3-hydroxybutyric acid from crotonic acid and hypochlorous acid. The resulting acid product is then treated with potassium hydroxide to form the potassium salt of 2,3-epoxybutyric acid. The potassium salt is subsequently transformed to the corresponding silver salt, and the latter salt is then converted to allyl 2,3-epoxybutyrate by treatment with allyl bromide in benzene solution. The disadvantages of the patentees' process are manifest.

Accordingly, one or more of the following objects will be achieved by the practice of this invention.

It is an object of this invention to provide a novel one-step process for transesterifying alkyl 2,3-epoxyalkanoate described hereinafter with allyl alcohol in the presence of certain metal alcoholate catalysts. It is another object of this invention to provide a novel transesterification process wherein competing self-polymerization, dimerization, rearrangement, reduction, and other undesirable side reactions are substantially prevented or substantially minimized. These and other objects of the present invention will become apparent to those skilled in the art from a consideration of the instant specification.

The alkyl 2,3-epoxyalkanoates which can be employed as reagents in the novel transesterification process of the invention can be characterized by the following structural formula:

(I)

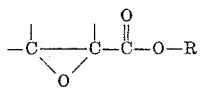

wherein R is a methyl or ethyl, and wherein each valence of the epoxy carbon atoms is satisfied by hydrogen, methyl, ethyl, or propyl. Typical alkyl 2,3-epoxyalkanoates which can be employed include methyl 2,3-epoxypropionate, methyl 2,3-epoxybutyrate, ethyl 2,3-epoxypropionate, ethyl 2,3-epoxybutyrate, methyl 2,3-epoxypentanoate, ethyl 2,3-epoxypentanoate, methyl 2,3-epoxyhexanoate, ethyl 2,3-epoxyhexanoate, methyl 2-ethyl-2,3-epoxyhexanoate, ethyl 2-ethyl-2,3-epoxyhexanoate, and the like.

Illustrative allyl 2,3-epoxyalkanoates which result from the novel transesterification process include, among others, allyl 2,3-epoxypropionate, allyl 2,3-epoxybutyrate, allyl 2,3-epoxypentanoate, allyl 2,3-epoxyhexanoate, allyl 2-ethyl-2,3-epoxyhexanoate, and the like.

The alkyl glycidic esters, i.e., alkyl 2,3-epoxyalkanoate reagents which are characterized by structural Formula I supra, can be prepared by the reaction of the corresponding alkyl 2-alkenoate with peracetic acid which is preferably employed as a solution in an inert organic medium such as ethyl acetate or acetone. The reaction temperature is maintained at 25° to 90° C. for a period of time sufficient to introduce oxirane oxygen at the site of the carbon-carbon double bond of the alkyl 2-alkenoate starting material. When the epoxidation reaction has gone to substantial completion or as far as desired, the reaction can be separated into its various components, for example, by fractional distillation, to recover the alkyl glycidic ester product. This epoxidation process is the subject matter of application Serial No. 696,043, entitled "Epoxidation of Unsaturated Compounds," by B. Phillips, D. L. MacPeek, and P. S. Starcher, filed November 13, 1957, and now abandoned, and assigned to the same assignee as the instant invention.

The metal alcoholate catalysts which are contemplated in the invention include sodium methoxide, potassium methoxide, sodium allyloxide, and potassium allyloxide. The preparation of the above-said catalysts is adequately set forth in the literature. If desired, sodium or potassium can be dissolved in excess allyl alcohol, the resulting solution thus comprisig both the allyl alchol reagent and the catalyst for the novel transesterification process.

The quantity of catalyst employed can vary over a wide range. In general, a catalyst concentration in the range of from about 0.1 weight percent, and lower, to about 20 weight percent, and higher, based on the weight of reaction charge is suitable. A catalyst concentration in the range of from about 0.5 weight percent to about 5.0 weight percent is preferred.

The proportion of the reagent, i.e., alkyl 2,3-epoxyalkanoate and allyl alcohol, can be varied over a wide range. In general, at least an equimolar amount of allyl alcohol to alkyl 2,3-epoxyalkanoate is suitable, though less than an equimolar quantity of allyl alcohol reagent to alkly 2,3-epoxyalkanoate reagent can be employed. A molar excess of allyl alcohol reagent to alkly 2,3-epoxyalkanoate reagent is preferred. Molar ratios of from about 1.5:1.0 to about 10.0:1.0 and higher, of allyl alcohol reagent to alkyl 2,3-epoxyalkanoate reagent are preferred. The excess allyl alcohol reagent hastens the reaction and also functions as a diluent which can be recovered from the reaction product mixture by conventional means such as fractional distillation.

Although not necessary, an inert organic diluent can be employed in ester exchange reaction. Typical diluents include, among others, aliphatic and aromatic hydrocarbons, e.g., n-pentane, n-hexane, benzene; organic ethers, e.g., diethyl ether, diisopropyl ether and the like.

As a practical matter, the optimum operating conditions will depend, to an extent, on the correlation of factors such as the temperature employed, the alkyl 2,3-epoxyalkanoate reagent used, the proportions of the reagents, the particular catalyst employed, the concentration of the catalyst, and other considerations. For efficient results, the ester exchange reaction is conducted at relatively low temperatures and under reduced pressures to prevent substantial decomposition of the alkyl 2,3-epoxyalkanoate charge. A temperature in the range of from about 0° to about 125° C., and higher, is suitable; from about 0° to about 100° C. is preferred; and from about 10° C. to about 60° C. is most preferred. The pressure, of course, is dependent upon the desired operating temperature. When employing equipment consisting of, for example, a still kettle connected to a still column which has a reflux condenser attached thereto, the transesterification reaction is preferably effected by refluxing the reaction mixture at a temperature in the range from about 20° to about 125° C. and at a pressure in the range from about 10 mm. to about 760 mm. of Hg. The kettle temperature range is preferably maintained at from about 40° to about 75° C. The pressure in the system can be the autogenous pressure provided by the allyl alcohol reagent at the available kettle temperature. The reaction period will be governed by such variables noted previously, and, to an extent, by the correlation of the operable temperatures and pressures which are employed. A reaction period of less than about 6 hours is desirable, though not a necessity.

The allyl 2,3-epoxyalkanoate product can be recovered from the reaction mixture, for example, by distillation, usually after neutralization of the catalyst. The glycidic ester product can also be recovered as a residue product after distillation, if any, of the excess allyl acohol reagent. The residue product then can be purified by careful washing with dilute aqueous acid or dilute aqueous base to remove impurities therefrom, or by crystallization, or other methods or recovery.

The allyl 2,3-epoxyalkanoates of the invention are a useful class of compounds. The allyl 2,3-epoxyalkanoates are characterized by possessing at least one 2,3-epoxyalkanoate group, i.e.

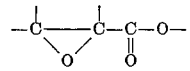

and one allyl group, i.e., $CH_2=CH-CH_2-$ group. The allyl 2,3-epoxyalkanoates, being bifunctional organic compounds, can be homopolymerized through the epoxy group

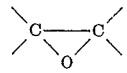

by the use of, for example boron trifluoride as a catalyst therefor, to thus produce relatively low molecular weight polymeric products. These low molecular weight polymer products can be cured at elevated temperatures and/or a peroxide catalyst, e.g., benzoyl peroxide, tert. butyl hydroperoxide, etc., to give a cross-linked resin. If desired, the above-said low molecular weight polymer products can be dissolved in various inert organic solvents, e.g., low molecular weight aliphatic ketones, esters, etc., to produce solutions which have applicability in the coatings art. The resulting solutions can be applied as coatings on various surfaces and cured at elevated temperatures and/or by the use of a peroxide catalyst to give hard, cross-linked coatings. In addition, many of the glycidic esters of this invention can be homopolymerized to useful, hard polymers in the manner outlined in U.S. Patent No. 2,680,109. The allyl 2,3-epoxyalkanoates, also, can be copolymerized with monomers such as vinyl chloride, acrylonitrile, and the like, to form polymers capable of being shaped or molded into useful objects.

The following examples are illustrative.

*Example 1*

Methyl crotonate (300 grams, 3 mols) was contacted with 3.9 mols of peracetic acid (25.0 weight percent solution in acetone) at 85°–90° C. for 6 hours. Distillation of the reaction mixture gave 213 grams of methyl 2,3-epoxybutyrate having the following properties.

Boiling point_____84°–85° C./49 mm. of Hg.
$n_D^{30}$_____1.4150.
Density 26/4_____1.075.
Purity by saponification
  analysis_____99.0 percent.
Infrared spectrum:
  Disclosed strong absorption at $11.5\mu$ and $12.8\mu$; similar to that for ethyl 2,3-epoxybutyrate.

The yield was 61 percent.

*Example 2*

Metallic sodium (1.2 grams, 0.052 mol) was dissolved in 580 grams (10 mols) of anhydrous allyl alcohol in a one liter four necked flask. After the sodium had reacted completely, 116 grams (1 mol) of methyl 2,3-epoxy butyrate was added, and then the flask was attached to a one foot unpacked still column fitted with a —5° C. brine-cooled reflux condenser. The solution was refluxed at 65 mm. of Hg, and material boiling below the boiling point of allyl alcohol was removed at the head. This operation required approximately two hours, and the kettle temperature was maintained below 40° C. throughout. At the end of this period, even under total reflux, the head temperature did not drop below the boiling point of allyl alcohol.

Acetic acid (3.5 milliliters) was added to the reaction solution to destroy the catalyst contained therein. Subsequently, the reaction solution was distilled, and after removal of the excess allyl alcohol, a fraction (161 grams) boiling between 36° C. at 40 mm. of Hg and 93° C. at 25 mm. of Hg was collected. This fraction was then redistilled on a 17½ inch by 1⁷⁄₁₆ inch column packed with ⅛ inch protruded stainless steel packing. From this redistillation there was obtained 43 grams of allyl 2,3-epoxybutyrate having the following properties.

Boiling point_____ 96°–97° C./25 mm. of Hg.
$n_D^{30}$_____ 1.4362.
Purity by saponification analysis___ 99.6 percent.
Purity by bromination analysis____ 98.2 percent.
Purity by pyridine HCl method for
  epoxide analysis_____ 95.5 percent.
Infrared spectrum:
  Consistent with that expected for allyl 2,3-epoxybutyrate. Found absorption bands at $5.80\mu$ (ester carbonyl group); at $6.08\mu$ (carbon to carbon double bond); at $10.08\mu$ and $10.75\mu$ (vinyl group); and at $11.6\mu$ and $12.8\mu$ (transepoxy group).

The yield was 37 percent.

When an equivalent molar amount of metallic potassium is substituted for metallic sodium, essentially the same results are obtained.

*Example 3*

Methyl 2,3-epoxybutyrate (323 grams, 2.79 mols), allyl alcohol (970 grams, 16.7 mols), and sodium methoxide (5 grams) were charged to a still kettle and refluxed under 50 mm. of Hg pressure. A partial take-off was maintained at the head until the boiling point of allyl alcohol was reached. Then an additional 12 grams of sodium methoxide was added to the still kettle and the reaction was carried on as before until only allyl alcohol was present in the still head. Then most of the excess allyl alcohol was stripped off, and a product cut of 450 grams having a boiling range of 38° C./50 mm. of Hg to 68° C./5 mm. of Hg was collected. This distillate was fractionally distilled to yield 228 grams of allyl 2,3-epoxybutyrate having the following properties:

Boiling point _____ 96°–98° C./25 mm. of Hg.
$n_D^{30}$ _____ 1.4362.

The yield was 58 percent.

*Example 4*

A weight of 372 grams (2.0 mols) of ethyl 2,3-epoxy-2-ethylhexanoate was added to a solution of 15 grams of sodium methoxide in 928 grams (16 mols) of allyl alcohol. The mixture was brought to reflux in a still system equipped with a 60-inch fractionating column. At 50 mm. of Hg pressure, a mixture of ethanol and allyl alcohol was removed at the still head over a 4.75 hour period at 22°–25° C. The reaction mixture was then rapidly freed of allyl alcohol by distillation. The remaining allyl ester was rapidly flash distilled away from residue. Subsequent fractional distillation gave 317 grams of allyl 2,3-epoxy-2-ethylhexanoate having the following properties:

Boiling point _____ 70° C./1 mm. of Hg.
$n_D^{30}$ _____ 1.4402.
Purity by saponification analysis___ 99.6 percent.

The yield was 80.0 percent of the theoretical.

Various modifications and embodiments of this invention can be made without departing from the spirit and scope thereof.

What is claimed is:

1. A transesterification process which comprises contacting alkyl 2,3-epoxyalkanoate having the following formula:

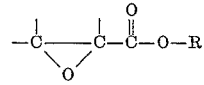

wherein R is selected from the group consisting of methyl and ethyl, and wherein each valence, individually, of the epoxy carbon atoms is satisfied by a member selected from the group consisting of hydrogen, methyl, ethyl and propyl; with allyl alcohol; in the presence of a catalyst selected from the group consisting of sodium methoxide, potassium methoxide, sodium allyloxide, and potassium allyloxide; at a temperature in the range of from about 0° C. to about 125° C.; and for a period of time sufficient to produce the corresponding 2,3-epoxyalkanoate ester of said allyl alcohol.

2. A transesterification process which comprises contacting methyl 2,3-epoxybutyrate with allyl alcohol; in the presence of sodium allyloxide catalyst; at a temperature in the range of from about 0° C. to about 125° C.; and for a period of time sufficient to produce allyl 2,3-epoxybutyrate.

3. A transesterification process which comprises contacting methyl 2,3-epoxybutyrate with allyl alcohol; in the presence of sodium methoxide catalyst; at a temperature in the range of from about 0° C. to about 125° C.; and for a period of time sufficient to produce allyl 2,3-epoxybutyrate.

References Cited in the file of this patent

UNITED STATES PATENTS

| | | |
|---|---|---|
| 2,567,675 | Marple et al. | Sept. 11, 1951 |
| 2,680,109 | Stevens et al. | June 1, 1954 |
| 2,698,308 | Crecelius | Dec. 28, 1954 |
| 2,889,339 | Levy et al. | June 2, 1959 |